(12) United States Patent
Schlaich et al.

(10) Patent No.: US 8,991,888 B2
(45) Date of Patent: Mar. 31, 2015

(54) PROTECTIVE DEVICE FOR A GRIPPING DEVICE ON A HANDLING APPARATUS, ESPECIALLY A HANDLING ROBOT

(75) Inventors: Peter Schlaich, Leonberg (DE);
Joachim Frangen, Heilbronn (DE);
Andreas Rueb, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/994,598

(22) PCT Filed: Dec. 9, 2011

(86) PCT No.: PCT/EP2011/072340
§ 371 (c)(1),
(2), (4) Date: Aug. 27, 2013

(87) PCT Pub. No.: WO2012/080131
PCT Pub. Date: Jun. 21, 2012

(65) Prior Publication Data
US 2013/0341944 A1 Dec. 26, 2013

(30) Foreign Application Priority Data
Dec. 16, 2010 (DE) .......................... 10 2010 063 202

(51) Int. Cl.
*B25J 19/06* (2006.01)
*B25J 15/08* (2006.01)
*B25J 15/10* (2006.01)

(52) U.S. Cl.
CPC *B25J 15/08* (2013.01); *B25J 15/10* (2013.01); *B25J 19/06* (2013.01); *Y10S 901/49* (2013.01)
USPC .............................. 294/213; 294/86.4; 901/49

(58) Field of Classification Search
USPC ............... 294/86.4, 213, 907; 901/49, 45, 46; 74/490.01
See application file for complete search history.

(56) References Cited

U.S. PATENT DOCUMENTS

| 4,332,989 A |   | 6/1982 | Nicolaisen |  |
|---|---|---|---|---|
| 4,557,661 A | * | 12/1985 | Fischer et al. | 414/730 |
| 4,598,942 A | * | 7/1986 | Shum et al. | 294/106 |
| 4,725,190 A | * | 2/1988 | Kato | 414/730 |
| 4,828,276 A | * | 5/1989 | Link et al. | 279/33 |
| 6,129,476 A | * | 10/2000 | Berman et al. | 403/229 |

(Continued)

FOREIGN PATENT DOCUMENTS

| CN | 1543673 | 11/2004 |
| CN | 1851558 | 10/2006 |
| DE | 203 14 896 | 10/2004 |
| DE | 10 2008 023813 | 11/2009 |

(Continued)

OTHER PUBLICATIONS

International Search Report for PCT/EP2011/072340, dated Feb. 28, 2012.

*Primary Examiner* — Dean Kramer
(74) *Attorney, Agent, or Firm* — Kenyon & Kenyon LLP

(57) ABSTRACT

A protective device is provided for a gripping device on a handling apparatus, e.g., a handling robot. The gripping device has gripping parts in the form of gripping fingers, which gripping parts are movable using a transmission mechanism. The gripping device has at least one overload safety device as the protective device which, in response to the exceeding of a certain force on the gripping device, has the effect of an evasion of the gripping device. The protective device responds exclusively in response to forces which occur from a direction and which act upon the gripping parts outside a direction of forces required for gripping objects.

7 Claims, 4 Drawing Sheets

(56) References Cited

U.S. PATENT DOCUMENTS

| | | | |
|---|---|---|---|
| 6,523,875 B1 | 2/2003 | Ostholt | |
| 6,847,181 B2* | 1/2005 | Brooks et al. | 318/568.11 |
| 7,959,399 B2* | 6/2011 | Horning et al. | 414/737 |
| 8,123,015 B2* | 2/2012 | Yanai et al. | 192/56.41 |
| 8,601,897 B2* | 12/2013 | Lauzier et al. | 74/490.01 |
| 2006/0181092 A1* | 8/2006 | Kikut et al. | 294/2 |

FOREIGN PATENT DOCUMENTS

| | | |
|---|---|---|
| DE | 20 2009 012 392 | 2/2010 |
| EP | 1 424 174 | 6/2004 |
| JP | 63-202447 | 12/1988 |
| JP | 3-36786 | 4/1991 |
| SU | 795939 | 1/1981 |
| WO | WO 2006/117025 | 11/2006 |

* cited by examiner

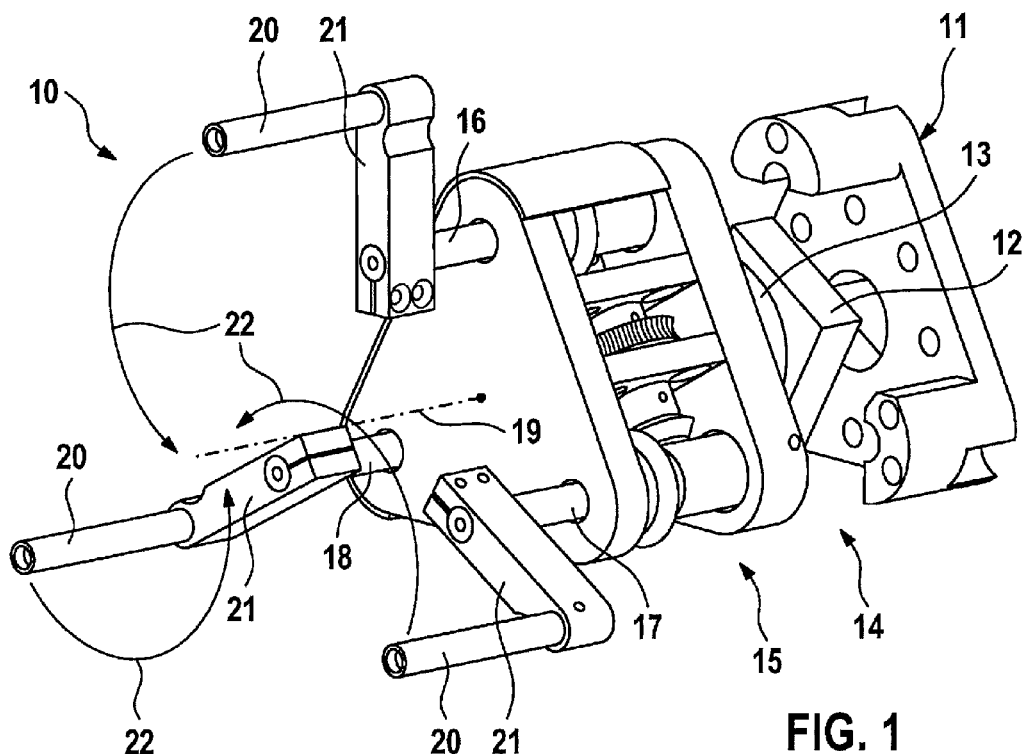
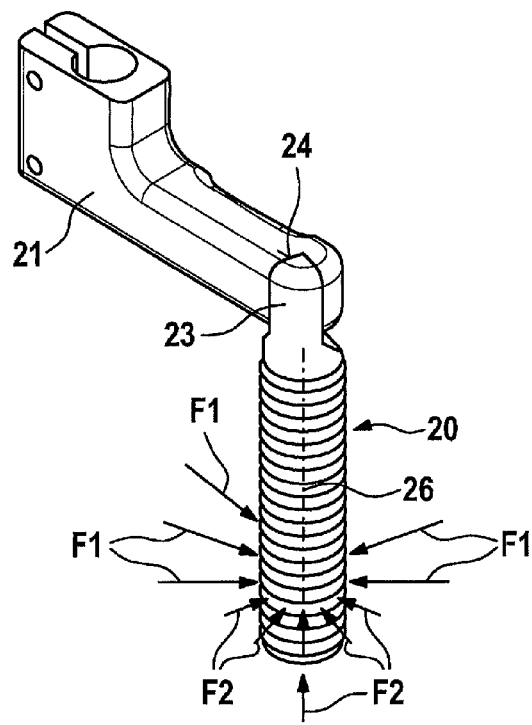
FIG. 1
FIG. 2

PROTECTIVE DEVICE FOR A GRIPPING DEVICE ON A HANDLING APPARATUS, ESPECIALLY A HANDLING ROBOT

BACKGROUND OF THE INVENTION

1. Field of the Invention

The present invention relates to a protective device for a gripping device on a handling apparatus, e.g., a handling robot.

2. Description of the Related Art

A protective device of this kind is known, for example, from German Utility Model Patent DE 203 14 896 U1. In the known protective device, on a gripping arm of the handling apparatus, a frame composed of pipes is situated, which has gripping elements and clamping elements for gripping workpieces or the like. It is provided, in this context, that when overloading occurs, using so-called deflection safety devices, evasion of the gripping elements and clamping elements takes place. The deflection safety devices for this purpose are developed as force-locking snap-in elements, particularly in the form of spring-loaded snap-in balls. What is essential in this instance is that an evasion and a response of the deflection safety devices should also take place if stress from a force or too big a load from one direction takes place which is required for gripping the workpiece or the like. This may lead, for example, to the falling off of an object having corresponding damage or the potential danger of injury of an operator that is located within the radius of action of the gripping device.

BRIEF SUMMARY OF THE INVENTION

An object of the present invention is based on refining a protective device for a gripping device on a handling apparatus in such a way that it is possible on the one hand to evade the gripping device when forces that are too big occur or in a collision case, but on the other hand, that evasion preferably takes place only if the collision or the force that is too great takes place from a direction which is not essential or required for the function of the gripping device. In this instance, the present invention is based on the idea of designing the protective device so that an overload safety device responds only in the case of one or more forces that come from a direction that runs outside the force direction that is required for the gripping.

Thereby, in response to reducing the forces acting on the collision object, in the collision case, particularly the falling down is avoided of an object that is to be gripped or is being held by the gripping device.

Gripping fingers may be used, in this instance, as the gripping part, it being provided in one preferred embodiment of the present invention that each of the gripping parts have an overload safety device, and that the overload safety device be developed as a force-locking safety device. This ensures a safe and reliable functioning of the protective device in response to a clear constructional effort.

It is quite particularly preferred that the overload safety device include at least one spring-loaded element, and that, upon a response of the overload safety device, it has the effect of an active motion of the gripping part in its deflection direction. In other words, this means that, if there is a collision case, the overload safety device effects an acceleration of the gripping part in a direction that is counter to the collision direction. The danger of damage or injury in the case of a collision is thereby additionally reduced.

In one additional embodiment of the present invention it is provided that the transmission mechanism for the gripping parts include at least one common drive shaft, and that an additional overload safety device having a spring-loaded element in the form of a contact piece be provided which cooperates with the at least one common drive shaft, and effects the evasion of the at least one drive shaft in the longitudinal direction.

Alternatively it may also be provided that the transmission mechanism for the gripping parts include a separate drive shaft for each gripping part, and that each separate drive shaft have an additional overload safety device having a spring-loaded element in the form of a contact piece which effects the evasion of the separate drive shaft in the longitudinal direction. This has the effect of producing a selective response or evasion of individual gripping parts.

Furthermore, it is particularly preferred that the overload safety device include at least one sensor element which produces a corresponding signal upon the response of the overload safety device. Using such a sensor element, one is then able to stop the operation of the handling device, for example, and to output a corresponding alarm signal to a control device.

Additional advantages, features and details of the present invention derive from the following description of preferred exemplary embodiments as well as from the figures.

BRIEF DESCRIPTION OF THE DRAWINGS

FIG. 1 shows a gripping device of a handling apparatus in a simplified perspective view.

FIG. 2 shows an individual gripping finger of the gripping device as in FIG. 1 in a perspective view.

DETAILED DESCRIPTION OF THE INVENTION

Figure 3:
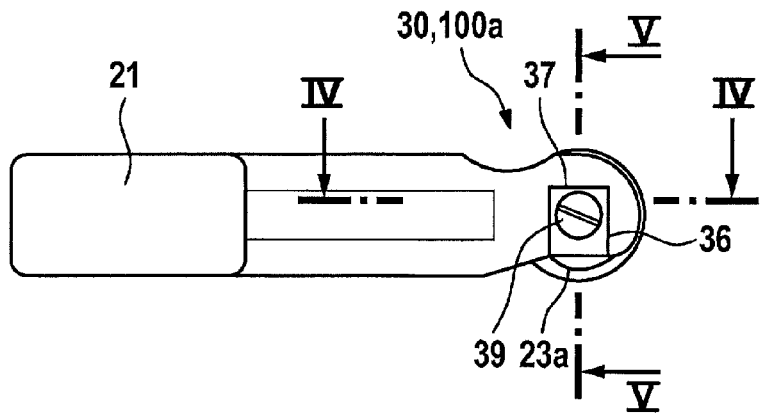
FIG. 3 shows a top view of a gripping finger modified from the one in FIG. 2.

The same components and components having the same function are provided with the same reference numerals in the figures.

FIG. 1 shows a gripping device 10, of the kind that may be, in particular, a component of a handling apparatus in the form of a handling robot. In this instance, gripping device 10 is situated on a movable arm of the handling apparatus (not shown) whose end facing gripping device 10 carries a carrier plate 11. A control electronics system 12 and a drive motor 13 are fastened to carrier plate 11. Drive motor 13 as a part of transmission mechanism 14 acts on three drive shafts 16 to 18, via a transmission 15. The three drive shafts 16 to 18 are situated in parallel to one another, at equal angular distances on a divided circle, to form a longitudinal axis 19 of gripping device 10. Each of drive shafts 16 to 18 has a gripping finger 20 associated with it, which is connected torsionally fixed to respective drive shafts 16 to 18 via a pivoting jaw. The three drive shafts 16 to 18, and thus also gripping fingers 20, are synchronously rotatable corresponding to arrow 22, in the counterclockwise direction, in order to be able to grip a body or an object, not shown in the figures, which is centered to longitudinal axis 19 while being held by gripping fingers 20.

In supplement, it should be mentioned that the present invention is not intended to be limited to gripping devices 10 having three gripping fingers. Rather, it is also conceivable that one might provide gripping devices 10 having two or even more than three gripping fingers 20.

FIG. 2 shows a single gripping finger 20 fastened to pivoting jaw 21 enlarged, in a first specific embodiment. One may particularly recognize that gripping finger 20, at its end face facing pivoting jaw 21, has a plug 23 that is approximately quarter-circular-shaped in cross section, which is situated in a corresponding quarter-circular-shaped recess 24 of the pivoting jaw. In addition, force arrows F1 and F2 of different lengths are shown symbolically. In this instance, force arrows F1 characterize those directions in which gripping finger 20 cooperates with an object in order to stop it. These force arrows F1 are those force arrows which have a relatively great length. Moreover, one may see force arrows F2 that have a length that is reduced compared to force arrows F1. These force arrows F2 run either in longitudinal axis 26 of gripping finger 20 or in an angular range of about 120° (with reference to a plane that is perpendicular to longitudinal axis 26). If there are forces in the direction of force arrows F2, these are not required for gripping the object using gripping finger 20. In particular, this may involve forces F which occur if gripping finger 20 or the object held by gripping finger 20 collides with another object (or another person) on a path of motion.

According to the present invention, it is provided that the situation of gripping finger 20 in pivoting jaw 21 is such that, in response to stressing by forces in the direction of force arrows F1, gripping finger 20 is situated fixed or rigidly in pivoting jaw 21. This problem is solved particularly by a form-locking situation between pivoting jaw 21 and gripping finger 20 in the area of plug 23 or recess 24.

Figure 6:
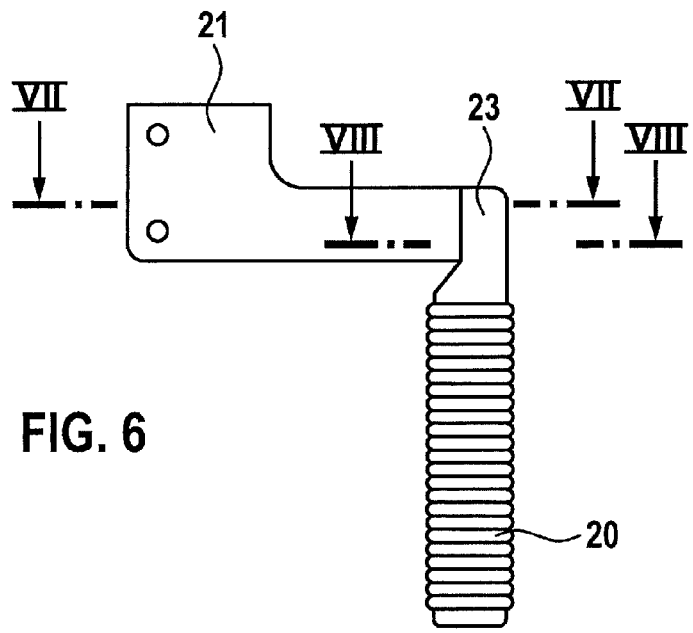
FIG. 6 shows the gripping finger as shown in FIG. 2 in a lateral view.
Figure 7:
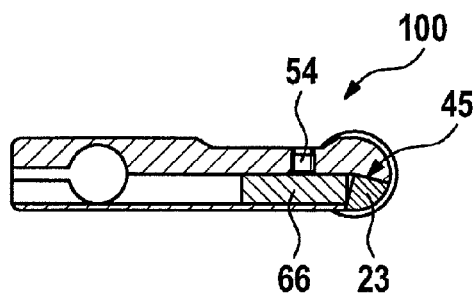
FIG. 7 shows a section in plane VII-VII of FIG. 6.
Figure 8:
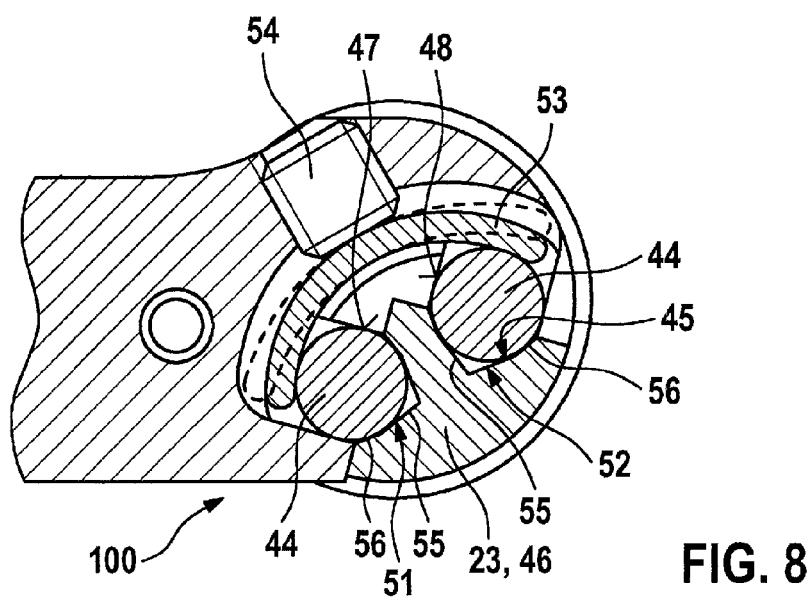
FIG. 8 shows a section in plane VIII-VIII of FIG. 6.

In order to make possible the evasion of gripping finger 20, in case forces from the direction of force arrows F2 act upon gripping finger 20, gripping device 10 has a protective device 100 developed as an overload safety device, whose construction or manner of operating will now be explained in greater detail with the aid of a first exemplary embodiment, with reference to FIGS. 6 to 8. Protective device 100, in this context, starts from a completely force-locking suspension of gripping finger 20 from its pivoting jaw 21. The development of protective device 100 is therefore such that, as a function of the direction of forces F1, F2, different releasing forces for gripping finger 20 are achieved.

Protective device 100 provides that gripping finger 20 is held in its relative position to pivoting jaw 21 via springly supported snap-in elements 44. In this instance, snap-in elements 44 may be developed ball-shaped, for example, or in the form of rollers. Pivoting jaw 21 has an approximately rectangular recess 45, in which the end of plug 23, that is developed as a circular segment 46, is situated. In recess 45, for each snap-in element 44 a recess 47, 48 is developed. Snap-in elements 44 engage in openings 51, 52 of plug 23, acting by the spring force of a spring element 53, whose prestress force is adjustable by an adjusting screw 54, on slantwise areas 55, 56 of openings 51, 52.

In this way, snap-in elements 44 together with the geometry of plug 23 form a wedge mechanism, by which force components are generated to the force initiation. In the process, there comes about a retaining force to be overcome from the prestress force because of spring element 53 and the edge angle of corresponding areas 55, 56. The respectively other prestressed snap-in element 44 is used for support, which introduces its retaining force, displaced by 90°, into the associated geometry of plug 23. The spring forces, thus working counter to each other, partially cancel out, and there results a composed retaining force which retains gripping finger 20 in recess 45 of pivoting jaw 21.

In supplement, it is mentioned that, in case snap-in elements 44 are developed as rollers, an alternative release force and a keyed connection may be achieved by the selection of the alignment and the finishing of snap-in elements 44 in one or more desired directions. It is also conceivable that one might use a plurality of snap-in elements 44 per contact area, which might be prestressed at different force levels if necessary.

Figure 4:
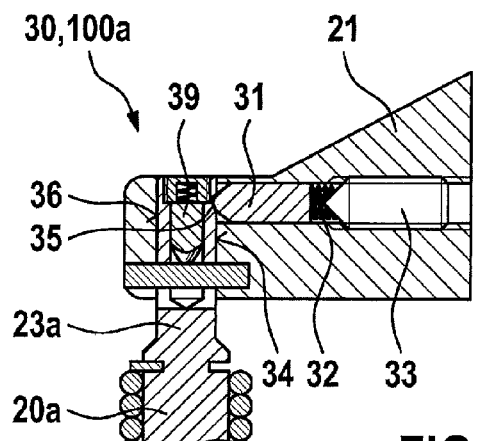
FIG. 4 shows a section in plane IV-IV of FIG. 3.
Figure 5:
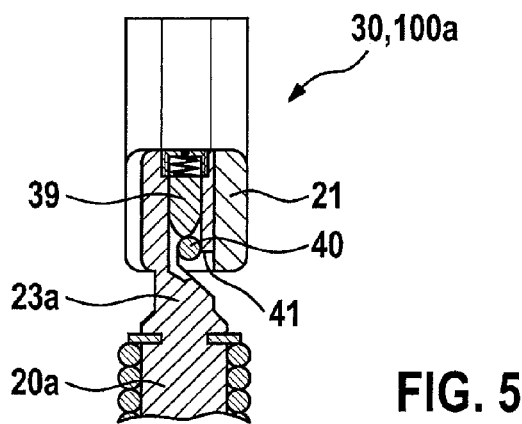
FIG. 5 shows a section in plane V-V of FIG. 3.

FIGS. 3 to 5 show a modified safety device 100a. Safety device 100a has a force-locked snap-in mechanical system 30 having a conical pin 31, which is prestressed using a pressure spring 32, the prestressing force of pressure spring 32 being modifiable by a stop screw 33. The end of the conical pin facing away from stop screw 33 acts on a planar side surface 34 of plug 23a, which engages there in a snap-in bore 35 developed in side surface 34. Plug 23a is supported, in this context, by an opposite side surface 36 of a U-shaped recess 37. An additional conical plug 39 counteracts the retaining force by pressing on a transversely running retaining pin 40.

Now, if this spring force, together with an external release force that acts based on the direction of force arrows F2, exceeds the retaining force of gripping fingers 20a in recess 37, gripping finger 20a is actively accelerated out of its mounting. In this instance, a hook-shaped recess 41 provides for retaining pin 40 a lateral ejection motion, which counteracts a possible tilting between a released gripping finger 20a and pivoting jaw 21.

Figure 9:
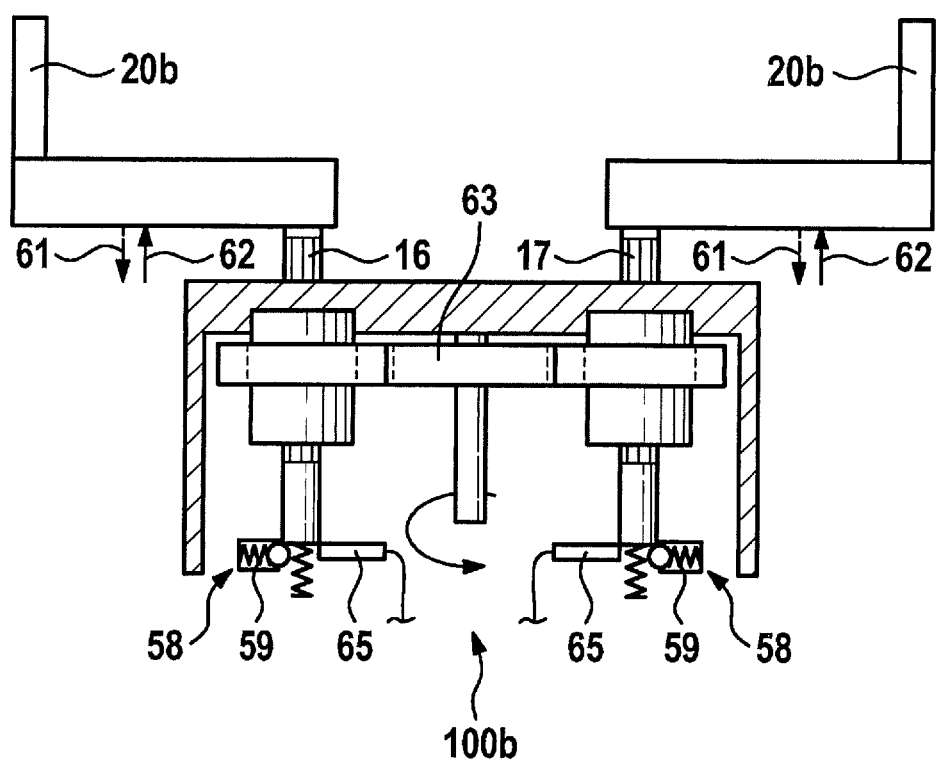
FIG. 9 shows a simplified section through a modified gripping device as in FIG. 1, in the vicinity of the transmission.

FIG. 9 shows an additional protective device 100b. This may be basically, but not necessarily developed like protective device 100. In protective device 100b, it is provided that each of drive shafts 16 to 18, shown only schematically in FIG. 1, of which in FIG. 9 only the two drive shafts 16 and 17 are recognizable, is equipped with a spring-loaded contact piece 58. Because of the prestressing force that is able to be set using pressure spring 59 of contact piece 58, the release force of protective device 100b is able to be set and influenced.

As soon as the forces act in the direction of arrows 61, 62, that is, in the longitudinal direction of drive shafts 16 to 18, respective drive shaft 16 to 18 may be brought ought of engagement with contact piece 58 using protective device 100b, so that corresponding drive shaft 16 to 18, if necessary, but not necessarily gets out of operative connection with drive gear 63. However, as soon as this is the case, respective gripping finger 20b is freely movable, which means that it is able to take evasive action.

Alternatively, it may also be provided that the three drive shafts 16 to 18 are provided with a common protective device 100b for all the gripping fingers (not shown), so that when a force is introduced in the direction of arrow 61, 62 into one of gripping fingers 20b, protective device 100b responds, and brings all gripping fingers 20b to evasion.

Furthermore, it is preferably provided that a sensor 65 is provided for protective device 100b, which detects a response of protective device 100b and outputs a corresponding signal at a control device of gripping device 10. This signal has the effect of stopping the operation of gripping device 10, or a corresponding optical or acoustical warning signal. Of course, it may also be conceivable or provided also to equip protective devices 100 and 100a with appropriate sensors 65. For this, we refer to FIG. 7, for example, in which a sensor 66 is shown which records an evasive motion of gripping finger 20a.

Protective devices 100, 100a and 100b described up to this point may be adapted or modified in various ways, without deviating from the idea of the present invention. This idea is that protective device 100, 100a and 100b responds when forces are acting on gripping fingers 20, 20a, 20b or gripping device 10, whose directions are such that they take place outside the directions required or needed for gripping and holding an object, but exceed a certain amount of force.

What is claimed is:

1. A protective device for a gripping device on a handling robot, the gripping device having gripping parts in the form of gripping fingers, and the gripping parts being movable using a transmission mechanism, wherein the protective device comprises:
   at least one overload safety device which, in response to exceeding of a threshold force on the gripping device, causes evasion by the gripping device, wherein the overload safety device responds exclusively in response to forces which occur from a selected direction and which act upon the gripping parts outside a direction of forces required for gripping objects;
   wherein each of the gripping parts has an overload safety device, and each overload safety device is configured as a force-locking overload safety device;
   wherein the force-locking overload safety device includes at least one spring-loaded element which, in response to the responding of the overload safety device, at least indirectly causes an active motion of the associated gripping part in a direction of evasion.

2. The protective device as recited in claim 1, wherein a blocking of the gripping part in a gripping direction is effected by a form-locking positioning of the gripping part in a recess of a carrier element which accommodates the gripping part.

3. The protective device as recited in claim 1, wherein a prestressing force and a releasing force on the spring-loaded element are changeable using an adjusting element.

4. A protective device for a gripping device on a handling robot, the gripping device having gripping parts in the form of gripping fingers, and the gripping parts being movable using a transmission mechanism, wherein the protective device comprises:
   at least one overload safety device which, in response to exceeding of a threshold force on the gripping device, causes evasion by the gripping device, wherein the overload safety device responds exclusively in response to forces which occur from a selected direction and which act upon the gripping parts outside a direction of forces required for gripping objects;
   wherein each of the gripping parts has an overload safety device, and each overload safety device is configured as a force-locking overload safety device;
   wherein the overload safety device has multiple snap-in elements which are each situated in a respective opening of the gripping part, and wherein the snap-in elements are loaded with a spring force of at least one spring element.

5. The protective device as recited in claim 4, wherein the snap-in elements generate a retention force upon the gripping part.

6. A protective device for a gripping device on a handling robot, the gripping device having gripping parts in the form of gripping fingers, and the gripping parts being movable using a transmission mechanism, wherein the protective device comprises:
   at least one overload safety device which, in response to exceeding of a threshold force on the gripping device, causes evasion by the gripping device, wherein the overload safety device responds exclusively in response to forces which occur from a selected direction and which act upon the gripping parts outside a direction of forces required for gripping objects;
   wherein:
   the transmission mechanism for the gripping parts includes at least one common drive shaft; and
   the overload safety device has a spring-loaded element, the spring-loaded element collaborating with the at least one common drive shaft and causing an evasion of the at least one common drive shaft in a longitudinal direction of the at least one common drive shaft.

7. A protective device for a gripping device on a handling robot, the gripping device having gripping parts in the form of gripping fingers, and the gripping parts being movable using a transmission mechanism, wherein the protective device comprises:
   multiple overload safety devices, wherein each of the overload safety devices causes, in response to exceeding of a threshold force on the gripping device, evasion by the gripping device, wherein each of the overload safety devices responds exclusively in response to forces which occur from a selected direction and which act upon the gripping parts outside a direction of forces required for gripping objects;
   wherein:
   the transmission mechanism for the gripping parts includes a separate drive shaft for each gripping part; and
   each of the separate drive shafts is provided with an associated one of the overload safety devices, each of the overload safety devices having a spring-loaded element causing an evasion of the separate drive shaft in a longitudinal direction.

\* \* \* \* \*